(12) United States Patent
Chun et al.

(10) Patent No.: US 8,509,209 B2
(45) Date of Patent: Aug. 13, 2013

(54) METHOD FOR TRANSMITTING BAND BITMAP IN WIRELESS COMMUNICATION SYSTEM

(75) Inventors: Jin Young Chun, Anyang-si (KR); Moon Il Lee, Anyang-si (KR); Wook Bong Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 12/936,902

(22) PCT Filed: Apr. 16, 2009

(86) PCT No.: PCT/KR2009/001960
§ 371 (c)(1), (2), (4) Date: Oct. 7, 2010

(87) PCT Pub. No.: WO2009/134026
PCT Pub. Date: Nov. 5, 2009

(65) Prior Publication Data
US 2011/0032878 A1 Feb. 10, 2011

Related U.S. Application Data

(60) Provisional application No. 61/048,228, filed on Apr. 28, 2008.

(30) Foreign Application Priority Data

Jun. 25, 2008 (KR) .......................... 10-2008-0060089

(51) Int. Cl.
*H04J 1/00* (2006.01)
*H04J 4/00* (2006.01)

(52) U.S. Cl.
USPC ........... 370/343; 370/437; 370/465; 370/480; 455/68; 455/69

(58) Field of Classification Search
USPC ................. 370/252, 310, 328, 329, 343, 346, 370/431, 437, 464, 465, 480, 496; 455/67, 455/68, 69, 11
See application file for complete search history.

(56) References Cited

U.S. PATENT DOCUMENTS

| | | | |
|---|---|---|---|
| 2006/0189321 A1* | 8/2006 | Oh et al. | 455/452.2 |
| 2007/0026810 A1* | 2/2007 | Love et al. | 455/67.11 |
| 2007/0253473 A1* | 11/2007 | Ishii et al. | 375/224 |
| 2008/0089281 A1* | 4/2008 | Yoon et al. | 370/329 |
| 2010/0284348 A1* | 11/2010 | Kashima et al. | 370/329 |
| 2011/0013563 A1* | 1/2011 | Sivanesan et al. | 370/328 |
| 2011/0032878 A1* | 2/2011 | Chun et al. | 370/328 |

FOREIGN PATENT DOCUMENTS

| | | |
|---|---|---|
| KR | 10-2006-0074795 A | 7/2006 |
| KR | 10-2007-0104702 A | 10/2007 |
| WO | 2008-042723 A1 | 4/2008 |

* cited by examiner

*Primary Examiner* — Benjamin H Elliott, IV
(74) *Attorney, Agent, or Firm* — Lee, Hong, Degerman, Kang & Waimey

(57) ABSTRACT

A method for transmitting a band bitmap in a wireless communication system is provided. The method includes selecting at least one selection band from a plurality of bands, the plurality of bands being distributed throughout a whole frequency band, grouping the plurality of bands into a plurality of band groups, setting a primary bitmap for each band group according to whether the selection band is included in each band group and setting a secondary bitmap for bands in each band group, and transmitting the primary bitmap and the secondary bitmap. Radio resources used to transmit a band bitmap can be reduced by decreasing the number of bits of the band bitmap.

6 Claims, 3 Drawing Sheets

Fig. 6

```
              Band#   0  1  2  3  4  5  6  7  8  9 10 11
                      V  V        V
          grouping    ⌣⌣ ⌣⌣ ⌣⌣ ⌣⌣ ⌣⌣ ⌣⌣

PRIMARY BITMAP     1     0     1     0     0     0
 SECONDARY BITMAP    11          10
```

Fig. 7

```
              Band#   0  1  2  3  4  5  6  7  8  9 10 11
                      V        V           V
          grouping    ⌣⌣ ⌣⌣ ⌣⌣ ⌣⌣ ⌣⌣ ⌣⌣

PRIMARY BITMAP     1     1     0     1     0     0
 SECONDARY BITMAP     0     1           1
```

METHOD FOR TRANSMITTING BAND BITMAP IN WIRELESS COMMUNICATION SYSTEM

This application is the National Stage filing under 35 U.S.C. 371 of International Application No. PCT/KR2009/001960, filed on Apr. 16, 2009, which claims the benefit of earlier filing date and right of priority to Korean Application No. 10-2008-0060089, filed on Jun. 25, 2008, and also claims the benefit of U.S. Provisional Application Ser. No. 61/048,228, filed on Apr. 28, 2008, the contents of which are all hereby incorporated by reference herein in their entireties.

TECHNICAL FIELD

The present invention relates to wireless communications, and more particularly, to a method for transmitting a band bitmap in a wireless communication system.

BACKGROUND ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

Hereinafter, a downlink is a communication link from a base station (BS) to a user equipment (UE), and an uplink is a communication link from the UE to the BS.

In general, the BS schedules uplink and downlink radio resources in the wireless communication system. User data or a control signal is carried on the uplink and downlink radio resources. A channel for carrying the user data is referred to as a data channel. A channel for carrying the control signal is referred to as a control channel. Various types of the control signal are required for communication between the BS and the UE. Examples of the control signal required for scheduling of radio resources in a multiple-antenna system include a channel quality indicator (CQI), a rank indicator (RI), a precoding matrix indicator (PMI), etc. The UE transmits the control information (e.g., the CQI, the RI, the PMI, etc.) to the BS. The BS schedules uplink and downlink radio resources according to the control signal received from a plurality of UEs.

In an orthogonal frequency division multiple access (OFDMA) system, a whole frequency band can be divided into several bands, and the control signal can be transmitted for each of the bands. Radio resources may be wasted when the control signal is transmitted for all bands. Thus, a specific band may be selected from the bands so that the control signal is transmitted for only the selected band. In this case, the UE also has to transmit a band bitmap to indicate which band is the selected band. In general, the number of bits of the band bitmap is equal to a total number of bands. That is, if the whole frequency band is divided into 12 bands, the band bitmap can be expressed by 12 bits. Accordingly, there is a need for a method for reducing radio resources required to transmit the band bitmap to the BS by decreasing the number of bits of the band bitmap.

DISCLOSURE OF INVENTION

Technical Problem

The present invention provides a method for transmitting a band bitmap by reducing radio resources.

Technical Solution

According to an aspect of the present invention, a method for transmitting a band bitmap in a wireless communication system is provided. The method includes selecting at least one selection band from a plurality of bands, the plurality of bands being distributed throughout a whole frequency band, grouping the plurality of bands into a plurality of band groups, setting a primary bitmap for each band group according to whether the selection band is included in each band group and setting a secondary bitmap for bands in each band group, and transmitting the primary bitmap and the secondary bitmap.

According to another aspect of the present invention, a method for transmitting a band bitmap in a wireless communication system is provided. The method includes selecting at least one selection band from a plurality of bands, the plurality of bands being distributed throughout a whole frequency band, grouping the plurality of bands into a plurality of band groups, setting a primary bitmap for each band group according to whether the selection band is included in each band group, and transmitting the primary bitmap on a first uplink control channel.

Advantageous Effects

According to the present invention, radio resources used to transmit a band bitmap can be reduced by decreasing the number of bits of the band bitmap.

BRIEF DESCRIPTION OF DRAWINGS

FIG. 6 shows a method for expressing a band bitmap according to an embodiment of the present invention.
FIG. 7 shows a method for expressing a band bitmap according to another embodiment of the present invention.

MODE FOR THE INVENTION

Hereinafter, exemplary embodiments of the present invention will be described in detail with reference to the accompanying drawings.

Figure 1:
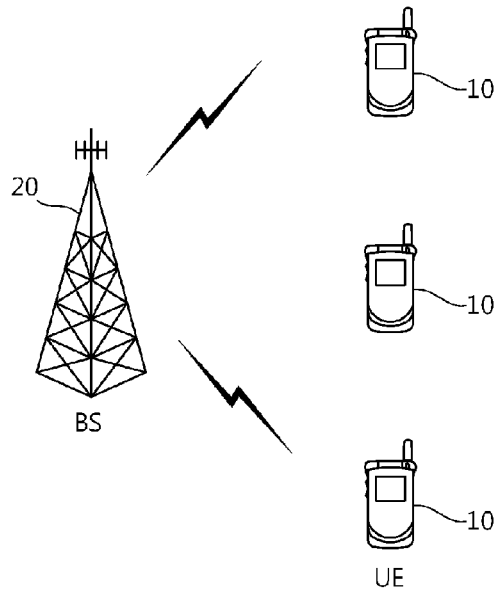
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers.

Figure 2:
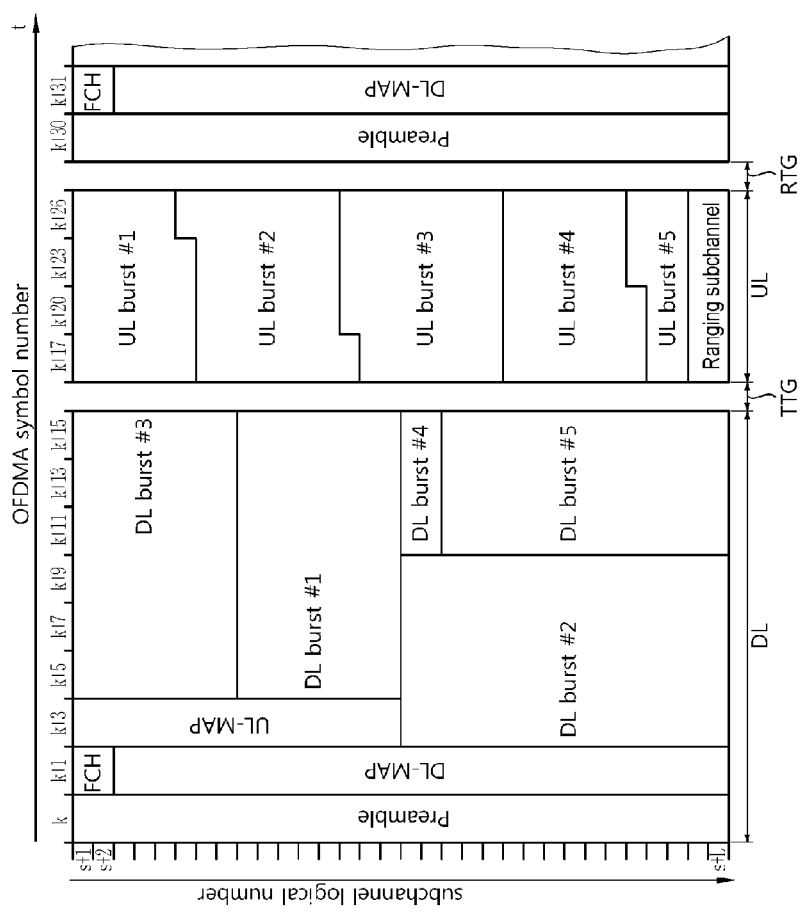
FIG. 2 shows an example of a frame structure.

FIG. 2 shows an example of a frame structure. A frame is a data sequence used according to a physical specification in a fixed time duration. This may be found in section 8.4.4.2 of the "Part 16: Air Interface for Fixed Broadband Wireless Access Systems" in the institute of electrical and electronics engineers (IEEE) standard 802.16-2004.

Referring to FIG. 2, the frame includes a downlink (DL) frame and an uplink (UL) frame. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a DL channel. This implies that the DL-MAP message defines DL channel indication and/or control information.

The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel. The UCD is periodically transmitted by the BS by using a UCD message.

A fast-feedback region is included in a portion of the UL frame. The fast-feedback region is a region which is allocated for faster uplink transmission than general uplink data transmission. A channel quality indicator (CQI) or an acknowledgement (ACK)/non-acknowledgement (NACK) signal can be carried on the fast-feedback region. The fast-feedback region may be located in any position in the UL frame, and the position or size of the fast-feedback region is not limited as described herein.

In the following description, a slot is a minimum unit of possible data allocation, and is defined with a time and a subchannel. The number of subchannels depends on an FFT size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), the subchannel includes 48 subcarriers. In partial usage of subchannels (PUSC), the subchannel includes 24 or 16 subcarriers.

In order to map data to the physical subcarrier in a physical layer, two steps are generally performed on the data. In a first step, the data is mapped to at least one data slot on at least one logical subchannel. In a second step, each logical subchannel is mapped to the physical subcarrier. FUSC, PUSC, optional-FUSC (O-FUSC), optional-PUSC (O-PUSC), adaptive modulation and coding (AMC), etc., are examples of a permutation rule introduced in the IEEE 802.16-2004 standard. A set of OFDM symbols using the same permutation rule is referred to as a permutation zone. One frame includes at least one permutation zone.

The FUSC and the O-FUSC are used only in downlink transmission. Each subchannel is mapped to the physical subcarrier distributed over the entire physical channel. This mapping varies for each OFDM symbol. The O-FUSC uses a pilot allocation scheme different from that used in the FUSC.

The PUSC is used both in downlink transmission and uplink transmission. In the downlink, each physical channel is divided into clusters, each of which includes 14 contiguous subcarriers on two OFDM symbols. The physical channel is mapped to 6 groups. In each group, pilots are allocated in fixed positions to each cluster. In the uplink, subcarriers are divided into tiles, each of which includes four contiguous physical subcarriers on three OFDM symbols. The subchannel includes 6 tiles. Pilots are allocated to the corners of each tile. Meanwhile, the O-PUSC is used only in uplink transmission, and each tile includes three contiguous physical subcarriers on three OFDM symbols. Pilots are allocated to the center of each tile.

The AMC is used for both downlink transmission and uplink transmission. A bin is a basic allocation unit in the downlink and uplink, and includes 9 contiguous subcarriers on one OFDM symbol. An AMC subchannel consists of 6 contiguous bits. A slot conforming to a format of the AMC subchannel may have a format of 6 bins ? 1 OFDM symbol, 3 bins ? 2 OFDM symbols, 2 bins ? 3 OFDM symbols, or 1 bin ? 6 OFDM symbols. In an AMC permutation rule, one physical band includes a 4-row bin, and one logical band denotes a group of physical bands. Therefore, if an FFT size is 2048 or 1024, the maximum number of logical bands is 12.

When the UE transmits channel information in the uplink, the transmitted channel information may be in regard to M logical bands having a good channel condition. In this case, an AMC band bitmap can be used to indicate the selected N logical bands. For example, a selected logical band can be expressed by '1', and an unselected logical band can be expressed by '0'. If 3rd, 5th, and 6th logical bands are selected from 12 logical bands, the AMC band bitmap can be expressed by '0b0010 1100 0000'.

Figure 3:
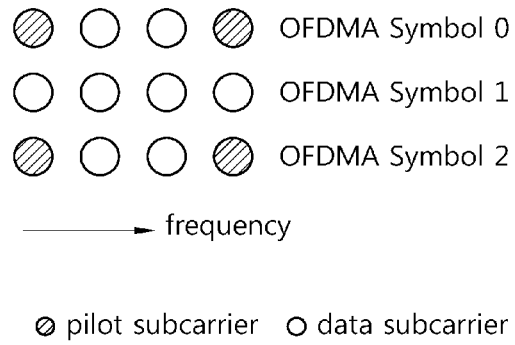
FIG. 3 shows an example of a tile.

FIG. 3 shows an example of a tile. The tile is a PUSC tile.

Referring to FIG. 3, one tile consists of 4 subcarriers in a frequency domain and 3 OFDM symbols in a time domain, that is, 12 subcarriers in total. The 12 subcarriers can be divided into 8 data subcarriers M0 to M7 and 4 pilot subcarriers. A data symbol is carried on the data subcarrier. The data symbol may be a symbol for user data or a control signal. A pilot or 'Null' can be carried on the pilot subcarrier. To utilize the pilot subcarrier, other data symbols may be carried and transmitted on the pilot subcarrier. In the uplink, a subchannel conforming to the PUSC permutation rule includes 48 data subcarriers and 24 pilot subcarriers.

Hereinafter, a channel quality indicator channel (CQICH) denotes an uplink control channel for transmitting a control signal such as a channel quality indicator (CQI). Examples of the control signal include a CQI, a rank indicator (RI), a precoding matrix indicator (PMI), etc.

The CQI may have various formats such as a signal to noise ratio (SNR), a signal to interference and noise ratio (SINR), a carrier to interference and noise ratio (CINR), a modulation and coding scheme (MCS) level, a data rate indicator, a received signal strength indicator, etc.

The PMI is also referred to as precoding matrix information or a codebook index.

The CQICH is classified into a primary CQICH and a secondary CQICH according to a mapping scheme for mapping a control signal onto a tile. The CQICH for transmitting the control signal may be mapped to one subchannel consisting of 6 tiles. As shown in FIG. 3, when the PUSC permutation rule is used, one tile consists of 8 data subcarriers and 4 pilot subcarriers. Channel information is mapped to the 8 data subcarriers of each tile. Table 1 below shows modulation symbols carried on the 8 data subcarriers of each tile. One modulation symbol is carried on one data subcarrier, and 8 modulation symbols carried on one tile constitute one vector. 8 types of vectors are formed in total, and indices of the vectors are in the range of 0 to 7.

TABLE 1

| Vector Index | $M_{n,8m}, M_{n,8m+1}, \ldots M_{n,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Herein, symbols constituting each vector can be expressed by Equation 1 below.

Math FIG. 1

$$P_0 = \exp\left(j\frac{\pi}{4}\right)$$
$$P_1 = \exp\left(j\frac{3\pi}{4}\right)$$
$$P_2 = \exp\left(-j\frac{3\pi}{4}\right)$$
$$P_3 = \exp\left(-j\frac{\pi}{4}\right)$$

[Math. 1]

Herein, vectors having different indices are orthogonal to one another.

Table 2 below shows an example of a vector allocated to the primary CQICH when a 6-bit payload is used.

TABLE 2

| 6-bit Payload (binary) | Fast-feedback vector indices per Tile Tile(0), Tile(1), ... Tile(5) | 6-bit Payload (binary) | Fast-feedback vector indices per Tile Tile(0), Tile(1), ... Tile(5) |
|---|---|---|---|
| 000000 | 0, 0, 0, 0, 0, 0 | 100000 | 6, 7, 5, 1, 2, 4 |
| 000001 | 1, 1, 1, 1, 1, 1 | 100001 | 7, 6, 4, 0, 3, 5 |
| 000010 | 2, 2, 2, 2, 2, 2 | 100010 | 4, 5, 7, 3, 0, 6 |
| 000011 | 3, 3, 3, 3, 3, 3 | 100011 | 5, 4, 6, 2, 1, 7 |
| 000100 | 4, 4, 4, 4, 4, 4 | 100100 | 2, 3, 1, 5, 6, 0 |
| 000101 | 5, 5, 5, 5, 5, 5 | 100101 | 3, 2, 0, 4, 7, 1 |
| 000110 | 6, 6, 6, 6, 6, 6 | 100110 | 0, 1, 3, 7, 4, 2 |
| 000111 | 7, 7, 7, 7, 7, 7 | 100111 | 1, 0, 2, 6, 5, 3 |
| 001000 | 2, 4, 3, 6, 7, 5 | 101000 | 7, 5, 1, 2, 4, 3 |
| 001001 | 3, 5, 2, 7, 6, 4 | 101001 | 6, 4, 0, 3, 5, 2 |
| 001010 | 0, 6, 1, 4, 5, 7 | 101010 | 5, 7, 3, 0, 6, 1 |
| 001011 | 1, 7, 0, 5, 4, 6 | 101011 | 4, 6, 2, 1, 7, 0 |
| 001100 | 6, 0, 7, 2, 3, 1 | 101100 | 3, 1, 5, 6, 0, 7 |
| 001101 | 7, 1, 6, 3, 2, 0 | 101101 | 2, 0, 4, 7, 1, 6 |
| 001110 | 4, 2, 5, 0, 1, 3 | 101110 | 1, 3, 7, 4, 2, 5 |
| 001111 | 5, 3, 4, 1, 0, 2 | 101111 | 0, 2, 6, 5, 3, 4 |
| 010000 | 4, 3, 6, 7, 5, 1 | 110000 | 5, 1, 2, 4, 3, 6 |
| 010001 | 5, 2, 7, 6, 4, 0 | 110001 | 4, 0, 3, 5, 2, 7 |
| 010010 | 6, 1, 4, 5, 7, 3 | 110010 | 7, 3, 0, 6, 1, 4 |
| 010011 | 7, 0, 5, 4, 6, 2 | 110011 | 6, 2, 1, 7, 0, 5 |
| 010100 | 0, 7, 2, 3, 1, 5 | 110100 | 1, 5, 6, 0, 7, 2 |
| 010101 | 1, 6, 3, 2, 0, 4 | 110101 | 0, 4, 7, 1, 6, 3 |
| 010110 | 2, 5, 0, 1, 3, 7 | 110110 | 3, 7, 4, 2, 5, 0 |
| 010111 | 3, 4, 1, 0, 2, 6 | 110111 | 2, 6, 5, 3, 4, 1 |
| 011000 | 3, 6, 7, 5, 1, 2 | 111000 | 1, 2, 4, 3, 6, 7 |
| 011001 | 2, 7, 6, 4, 0, 3 | 111001 | 0, 3, 5, 2, 7, 6 |
| 011010 | 1, 4, 5, 7, 3, 0 | 111010 | 3, 0, 6, 1, 4, 5 |
| 011011 | 0, 5, 4, 6, 2, 1 | 111011 | 2, 1, 7, 0, 5, 4 |
| 011100 | 7, 2, 3, 1, 5, 6 | 111100 | 5, 6, 0, 7, 2, 3 |
| 011101 | 6, 3, 2, 0, 4, 7 | 111101 | 4, 7, 1, 6, 3, 2 |
| 011110 | 5, 0, 1, 3, 7, 4 | 111110 | 7, 4, 2, 5, 0, 1 |
| 011111 | 4, 1, 0, 2, 6, 5 | 111111 | 6, 5, 3, 4, 1, 0 |

Next, the secondary CQICH can be mapped to one subchannel consisting of 6 tiles. When the PUSC permutation rule is used, the control signal is mapped to 4 pilot subcarriers of each tile. Table 3 below shows an example of a modulation symbol carried on the 4 pilot subcarriers of each tile.

TABLE 3

| Vector Index | $M_{n,4m}, M_{n,4m+1}, M_{n,4m+2}, M_{n,4m+3}$ |
|---|---|
| 0 | P0, P0, P0, P0 |
| 1 | P0, P2, P0, P2 |
| 2 | P0, P1, P2, P3 |
| 3 | P1, P0, P3, P2 |

$M_{n,4m+k}(0 \leq k \leq 3)$ denotes an index of a $k^{th}$ modulation symbol in an $M^{th}$ uplink PUSC tile of an $n^{th}$ secondary CQICH. The modulation symbol is modulated to one subcarrier. The 4 modulation symbols carried on one tile constitute one vector. 4 types of vectors are formed in total, and indices of the vectors are in the range of 0 to 3.

Symbols constituting each vector can be expressed by Equation 1 above. Herein, vectors having different indices are orthogonal to one another.

Table 4 below shows an example of a vector allocated to the secondary CQICH when a 4-bit payload is used.

TABLE 4

| Four-bit payload (binary) | Vector indices per tile Tile(0), Tile(1), Tile(2), Tile(3), Tile(4), Tile(5) | Four-bit payload (binary) | Vector indices per tile Tile(0), Tile(1), Tile(2), Tile(3), Tile(4), Tile(5) |
|---|---|---|---|
| 0000 | 0, 0, 0, 1, 1, 1 | 1000 | 0, 0, 1, 3, 2, 2 |
| 0001 | 1, 1, 1, 0, 0, 0 | 1001 | 1, 3, 2, 2, 3, 1 |
| 0010 | 2, 2, 2, 3, 3, 3 | 1010 | 2, 2, 3, 1, 0, 0 |
| 0011 | 3, 3, 3, 2, 2, 2 | 1011 | 3, 3, 1, 0, 1, 1 |
| 0100 | 0, 1, 2, 3, 0, 1 | 1100 | 0, 0, 3, 2, 0, 3 |
| 0101 | 1, 2, 3, 0, 1, 3 | 1101 | 1, 2, 0, 2, 2, 0 |
| 0110 | 2, 3, 0, 1, 2, 3 | 1110 | 2, 1, 3, 3, 1, 2 |
| 0111 | 3, 0, 1, 2, 3, 0 | 1111 | 3, 2, 2, 1, 1, 2 |

Mapping of the control signal on the CQICH may be found in sector 8.4.5.4.10 of the IEEE standard 802.16-2004 "Part 16: Air Interface for Fixed Broadband Wireless Access Systems".

Figure 4:
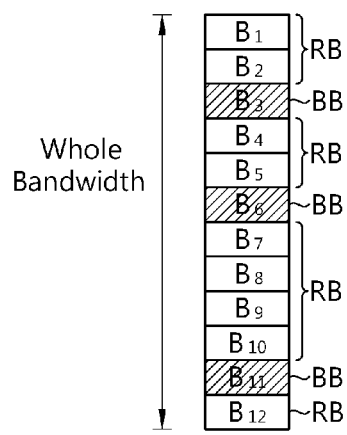
FIG. 4 shows an example of a whole frequency band divided into a plurality of bands.

FIG. 4 shows an example of a whole frequency band divided into a plurality of bands.

Referring to FIG. 4, the whole frequency band is divided into the plurality of bands. The bands are indicated by '$B_n$', where 'n' denotes an index of each band. Although the frequency band is divided into 12 bands in FIG. 4, this is for exemplary purposes only.

In an OFDMA system, the whole frequency band is divided into several bands, and a control signal is transmitted for each of the bands. In this case, frequency resources may be wasted when the control signal is transmitted for all bands. To address this problem, there is a method in which some bands are selected to transmit the control signal only for the selected bands. For example, a best-N method selects N bands having a good channel condition from the plurality of bands. The selected N bands are referred to as a best band (BB). Remaining bands other than the BB are referred to as a remaining band (RB). In FIG. 4, a best-3 method is used to select 3rd, 6th, and 11th bands (i.e., $B_3$, $B_6$ and $B_{11}$).

As shown in FIG. 4, if N BBs are selected by using the best-N method, a band bitmap can be used to indicate which bands are the selected N bands. For example, if the whole frequency band is divided into 12 bands, band B1 to B12 are expressed using corresponding bits of the band bitmap in such a manner that the selected bands are expressed by '1', and unselected bands are expressed by '0'. Thus, if the bands B3, B6, and B11 are expressed using the best-N method as shown in FIG. 4, the band bitmap can be expressed by '0010 0100 0010'.

A UE transmits the control signal to the BS together with the band bitmap. A BS schedules radio resources by using the received band bitmap and control signal. Since a 6-bit control signal can be transmitted on the primary CQICH and a 4-bit control signal can be transmitted on the secondary CQICH, up to 10 bits can be transmitted on one CQICH. Therefore, two CQICHs are required to transmit a 12-bit band bitmap. Accordingly, there is a need for a method for reducing the number of bits of the band bitmap to save radio resources.

Figure 5:
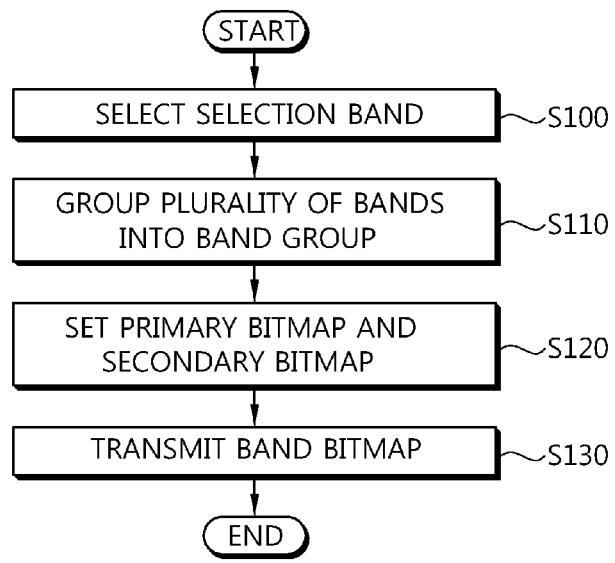
FIG. 5 is a flowchart showing a method for transmitting a band bitmap according to an embodiment of the present invention.

FIG. 5 is a flowchart showing a method for transmitting a band bitmap according to an embodiment of the present invention.

First, a selection band is selected from bands divided throughout a whole frequency band (step S100). The selection band can be selected according to a channel condition. That is, at least one band having a good channel condition can be selected from all bands.

Next, the bands divided throughout the whole frequency band are grouped into band groups (step S110). For example, if one band group includes P bands when the whole frequency band is divided into N bands, the whole frequency band includes N/P band groups in total.

Next, a primary bitmap and a secondary bitmap are set (step S120). The primary bitmap is set for each band group. The primary bitmap is set according to whether the selection band is included in each band group. For example, if the selection band is included in a band group, the primary bitmap for the band group may be indicated by '1', and if the selection band is not included in the band group, the primary bitmap for the band group may be indicated by '0'.

The secondary bitmap is set only for a band group including the selection band. The secondary bitmap may be set according to a position of the selection band located in the band group. For example, assume that two bands are included in one band group. In this case, if both of the two bands included in one band group are selection bands, the secondary bitmap may be indicated by '11, and if one band included in the band group is a selection band, the secondary bitmap may be indicated by '01'. Alter-natively, if a band located in an anterior position in one band group is the selection band, the secondary bitmap may be indicated by '0', and if a band located in a posterior position in one band group is the selection band, the secondary bitmap may be indicated by '1'. However, the setting of the bitmap described above is for exemplary purposes only, and thus various modifications can be made therein.

Next, the primary bitmap and the secondary bitmap are transmitted to a BS (step S130). A UE transmits the band bitmap on an uplink control channel. The uplink control channel may be a CQICH. A primary CQICH uses a 6-bit payload, and a secondary CQICH uses a 4-bit payload. Therefore, the primary bitmap can be transmitted on the primary CQICH, and the secondary bitmap can be transmitted on the secondary CQICH.

According to the conventional technology, two CQICHs, i.e., two slots, are used to transmit a band bitmap whose number of bits is 12. However, according to the present invention, the band bitmap can be transmitted on the primary CQICH and the secondary CQICH, i.e., on one slot, by reducing the number of bits of the band bitmap, thereby saving uplink radio resources.

FIG. 6 shows a method for expressing a band bitmap according to an embodiment of the present invention.

Referring to FIG. 6, a whole frequency band is divided into 12 bands in total, and each band has an index of 0 to 11. In FIG. 6, a best-3 method is used, and bands #0, #1, and #4 indicated by 'v' are selection bands.

First, the 12 bands are grouped into 6 band groups each including two contiguous bands. That is, the band #0 and the band #1 belong to one band group, and the band #2 and the band #3 belong to another band group.

Next, a primary bitmap is set for each of the 6 band groups. For example, if a selection band exists in each band group, the bitmap is set to '1', and if there is no selection band, the bitmap is set to '0'. Since the band #0, the band #1, and the band #4 are selection bands in FIG. 6, the bitmap for the 6 band groups can be expressed by '101000'.

Next, a secondary bitmap is set for bands included in a band group. In this case, among the 6 band groups, the bitmap is set only for a band group including a selection band. Since the band #0, the band #1, and the band #4 are selection bands in FIG. 6, the bitmap is set for bands included in a first band group and a third band group. As shown in FIG. 6, if the bitmap is set to '1' when the band in the band group is the selection band and if the bitmap is set to '0' when the band in the band group is not the selection band, then the bitmap of the first band group is '11', and the bitmap of the third band group is '10'. Therefore, the secondary bitmap can be expressed by '1110'.

In FIG. 6, the primary bitmap can be transmitted on the primary CQICH to the BS since the number of bits of the primary bitmap is 6 bits, and the secondary bitmap can be transmitted on the secondary CQICH to the BS since the number of bits of the secondary bitmap is 4 bits. Therefore, the band bitmap can be transmitted to the BS on the primary CQICH and the secondary CQICH, i.e., on one slot. Accordingly, radio resources can be saved unlike in a conventional case of transmitting the band bitmap on two slots.

FIG. 7 shows a method for expressing a band bitmap according to another embodiment of the present invention.

Referring to FIG. 7, a whole frequency band is divided into 12 bands in total, and each band has an index of 0 to 11. In FIG. 7, a best-3 method is used, and bands #0, #3, and #7 indicated by 'v' are selection bands.

First, the 12 bands are grouped into 6 band groups each including two contiguous bands. That is, the band #0 and the band #1 belong to one band group, and the band #2 and the band #3 belong to another band group.

Next, a primary bitmap is set for each of the 6 band groups. For example, if a selection band exists in each band group, the bitmap is set to '1', and if there is no selection band, the bitmap is set to '0'. Since the band #0, the band #3, and the band #7 are selection bands in FIG. 7, the bitmap for the 6 band groups can be expressed by '110100'.

Next, a secondary bitmap is set for bands included in a band group. In this case, among the 6 band groups, the bitmap is set only for a band group including a selection band. Since the band #0, the band #3, and the band #7 are selection bands in FIG. 7, the bitmap is set for bands included in a first band group, a second band group, and a fourth band group. As shown in FIG. 7, if the bitmap is set to '0' when a band located in an anterior position in the band group is the selection band and if the bitmap is set to '1' when a band located in a posterior position is the selection band, then the bitmap of the first band group is '0', the bitmap of the second band group is '1', and the bitmap of the fourth band group is '1'. Therefore, the bitmap for bands in each band group can be expressed by '011'.

In FIG. 7, the primary bitmap can be transmitted on the primary CQICH to a BS since the number of bits of the primary bitmap is 6 bits, and the secondary bitmap can be transmitted on the secondary CQICH to the BS since the number of bits of the secondary bitmap is 3 bits. In this case, if the number of bits of the secondary bitmap is 3 bits, zero padding can be performed on a most significant bit (MSB) or a least significant bit (LSB).

Therefore, the band bitmap can be transmitted to the BS on the primary CQICH and the secondary CQICH, i.e., on one slot. Accordingly, radio resources can be saved unlike in a conventional case of transmitting the band bitmap on two slots.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a band bitmap in a wireless communication system, the method comprising:
    selecting at least one selection band from a plurality of bands, the plurality of bands being distributed throughout a whole frequency band;
    grouping the plurality of bands into a plurality of band groups;
    setting a primary bitmap for each of the plurality of band groups according to whether the at least one selection band is included in each of the plurality of band groups;
    setting a secondary bitmap only for at least one selection band group including the at least one selection band according to a position of the at least one selection band in the at least one selection band group; and
    transmitting the primary bitmap and the secondary bitmap.

2. The method of claim 1, wherein the each of the plurality of band groups includes two consecutive bands among the plurality of bands.

3. The method of claim 1, wherein the at least one selection band is selected by considering a channel condition.

4. The method of claim 1, wherein a bit of the primary bitmap for each of the plurality of band groups is set to '1' if the at least one selection band is included in each of the plurality of band groups, and
    wherein a bit of the primary bitmap for each of the plurality of band groups is set to '0' if the at least one selection band is not included in each of the plurality of band groups.

5. The method of claim 1,
    wherein a bit of the secondary bitmap for each of the at least one selection band group is set to '1' if the at least one selection band is located in an posterior position in each of the at least one selection band group, and
    wherein a bit of the secondary bitmap for each of the at least one selection band group is set to '0' if the at least one selection band is located in an anterior position in each of the at least one selection band group.

6. The method of claim 1, wherein the primary bitmap is transmitted on a primary channel quality indicator channel (CQICH), and wherein the secondary bitmap is transmitted on a secondary CQICH.

* * * * *